May 16, 1950     R. A. STREMEL     2,507,870
ELECTRIC MOTOR CONTROL SYSTEM
Filed April 10, 1946
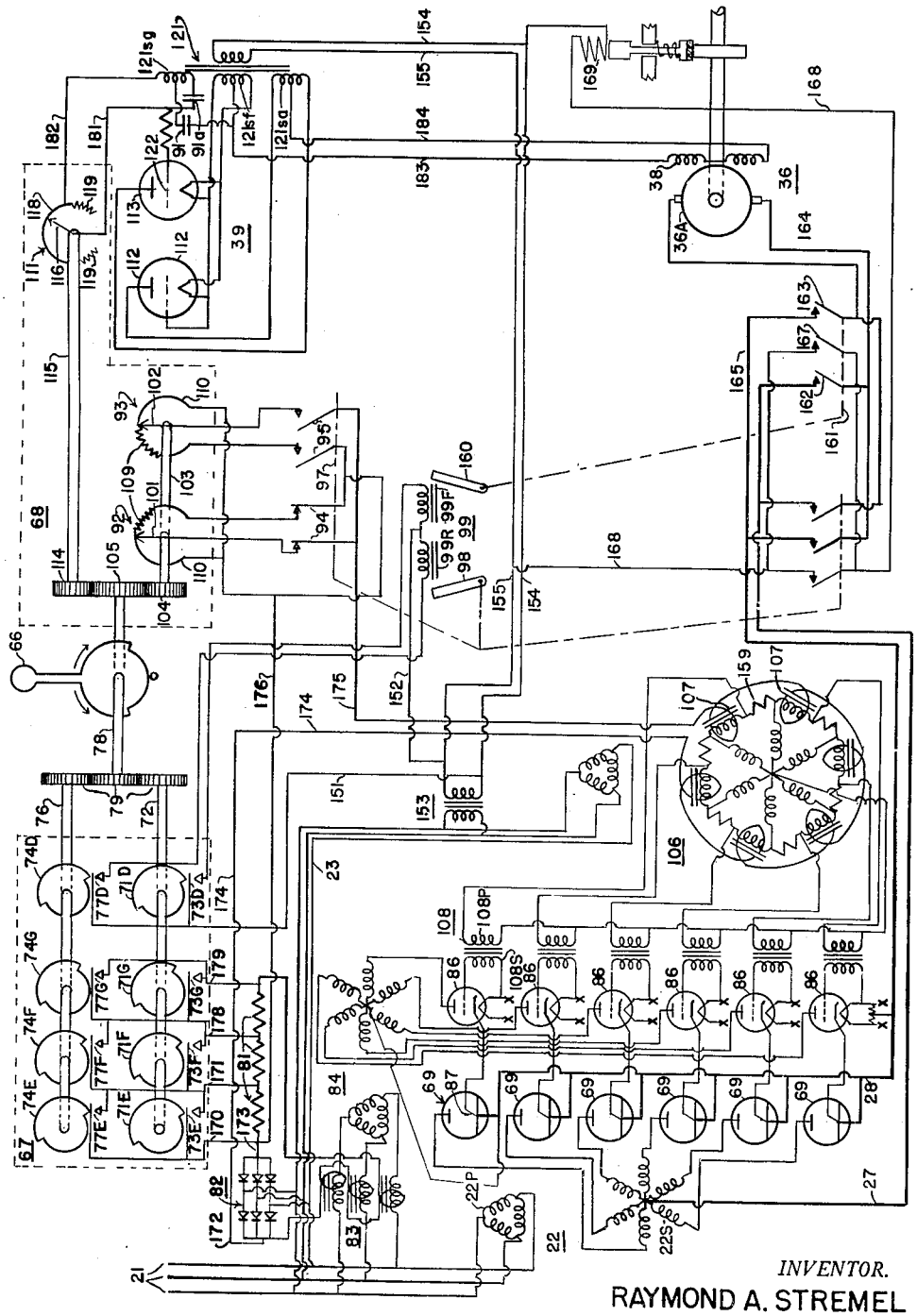
*INVENTOR.*
RAYMOND A. STREMEL
BY *Charles S. Evans*
*his attorney*

Patented May 16, 1950

2,507,870

UNITED STATES PATENT OFFICE 2,507,870

ELECTRIC MOTOR CONTROL SYSTEM

Raymond A. Stremel, Concord, Calif., assignor to Yuba Manufacturing Company, San Francisco, Calif., a corporation of California Application April 10, 1946, Serial No. 660,986

8 Claims. (Cl. 318—263)

My invention relates to a system of control for the electrical drives of various mechanisms which require wide variations in speed and torque and frequent reversing.

My invention has a great many objects, all of which relate to increased efficiency particularly in respect to dredging operations in the broad field of mining. More specifically, one of the objects of my invention is the more efficient use of direct current motors as prime movers, with constant torque and speed irrespective of load, within the horse power capacity of the motors. Another object is greater economy in the use of electric energy which is conservatively estimated to amount to 10% over any other system.

The invention possesses other objects, some of which with the foregoing will be set forth at length in the following description wherein is explained that form of the invention which has been selected for illustration in the drawings accompanying and forming a part of this specification. In said drawings, one form of the invention is shown, but it is to be understood that it is not limited to that form, since the invention as set forth in the claims may be embodied in a plurality of forms.

In the drawings, the drawing is a diagrammatic presentation of the system of this invention.

One method of speed control in use prior to my invention, comprises an alternating current induction motor with manual or magnetic controller, and a bank of resistors in the secondary or rotor circuit of the motor. Another method of speed control comprises a motor-generator set which furnishes variable voltage to the armatures of the respective driving motors. The former method is the more common, but the latter, because of its operating characteristics, is preferable, although first cost and maintenance expense is greater.

In utilizing the electrical equipment just mentioned, to effect variable speed in the alternating current type, the controller may be arranged with 3 to 8 steps, the last step giving the operating speed. The resistors are in the rotor circuit of the motor, and may be cut in or cut out by means of the controller. The motor has varying speed characteristics. It is usually not feasible to operate at less than 50% of full speed, although there is frequent need for doing so.

In utilizing the direct current system to effect variable speed in the direct current motor drives, three phase alternating current power is brought to the motor of a motor-generator set. A generator is required for each of the motors on any of the drives. The generators however are all on a common shaft. The operator controls the speed from standstill to basic speed of motor by varying the field rheostat on the generator. Speeds above basic speeds are obtainable from the same controller through the use of resistance inserted in the field of the motor.

The electrical apparatus and operation just described as constituting the practice prior to my invention has many serious deficiencies, which it is my object to eliminate in the present invention.

The deficiencies in the alternating current motor, which it is my purpose to eliminate, are several in number which are as follows:

The available controllable speed range in insufficient to meet operational requirements, being limited to a ratio of approximately two to one.

The alternating motor drive system is subject to poor speed regulation, the speed varying excessively with varying loads.

The efficiency of the alternating wound-rotor motor system including the external speed control resistor is seriously reduced by the losses in the external resistor and this loss is proportional to the extent of speed reduction. This is an item of particular concern in the bucket line drive motor systems which usually consume as much as 30% to 50% of the total energy requirements.

The alternating current wound rotor motors entail the need of accelerating relays and magnetically operated contactors for varying the amount of resistance in the external speed control resistance, and in large installations this necessitates large and expensive panel boards.

In the direct current motors utilizing motor driven converters, the deficiencies are: A generator is required for each motor. All generators and exciters are directly connected on a common shaft with the alternating current driving motor, which involves considerable space and weight, and requires a special base. Maintenance requirements are high. Rotating equipment requires considerable attention. An entire motor generator set must be in operation to effect functioning of any individual drive at times when the dredge is not in full course of digging operations, causing waste of power, considerable vibration and noise.

With these deficiencies of the previous systems in mind, it is the purpose of my present invention to provide improved electrical adjustable speed apparatus for various drives on dredges which has the following improved characteristics: A wide range of speeds to permit best operation in varying formations of ground. A saving of space and weight. An installation which requires less attention and maintenance, and one which permits smoother control. An installation allowing operation of individual equipment without operating an entire power generation unit. Self protection against excessive overload condition without opening circuit breakers. An installation in which the efficiency of conversion is considerably higher than possible to obtain with motor generator sets. Installation costs are reduced since no special foundation is required. Elimination of vibration other than transformer hum is obtained. An installation in which no special ventilation is required.

In broad descriptive terms, the apparatus of my invention comprises an electronic conversion unit for each drive requiring variable speed on the motors mentioned above. This will consist of one anode transformer, and a bank of ignitron rectifiers and a direct current motor for each drive.

All of the drives in my system are arranged with adjustable speed motors in order to gain the advantages of operating at an optimum speed to match varying operating conditions at a greater efficiency than previously possible.

The electronic system is arranged with a main anode transformer of sufficient capacity to supply all adjustable speed drives. The secondary of the main anode transformer is arranged for 6-phase distribution; and each motor is provided with its own set of ignitron rectifier tubes connected to the 6-phase bus. Associated with each motor is also a manually operated controller by which it may be individually controlled.

The starting and variable speed up to basic of each motor is obtained by varying the voltage to the armature. The field supply is held constant up to and including basic speed, at which time the speed may be increased beyond basic speed by reducing the voltage to the shunt field. A very low power level type of control equipment is used.

Adjustable voltage input to the motor armature is obtained by varying the firing point of a bank of ignitron rectifier tubes. The current used to fire the ignitron rectifiers is furnished by thyratron grid controlled rectifier tubes. The control grid of the thyratron actuates the starting of the discharge. By supplying the grid with a voltage whose phase with respect to the anode voltage can be shifted, the thyratron tube will conduct only after that part of the cycle at which the grid voltage reaches its critical value. In other words, a phase shifting device that can supply to a thyratron, a grid voltage between 0° and 180° out of phase with its anode voltage, can thereby control the thyratron output voltage and current from approximately zero to full operating voltage.

In the drawing I have illustrated diagrammatically a typical electronic supply unit and control unit and their circuits, for the operation of motor 36. The magnitude of speed and direction of rotation of the motor 36 is controlled within the 87° arc of travel of its controller handle 66 in either direction from its neutral or "off" position. The controller assembly consists of two main parts, the master switch section 67 comprised of a number of switches, and the potentiometer rheostat section 68.

The master switch section serves two purposes: first; to control direction of rotation of the motor 36; and second, to control the magnitude of the ignitor current to the ignitron rectifier tubes 69, which supply power to the motor armature 36A.

A series of cams 71D, 71E, 71F and 71G comprising disks rotarily adjustable to vary the degree and angular placement of the high or actuating face of the cam, is arranged on the shaft 72 to open and close single pole switches 73D, 73E, 73F and 73G; and a similar series of cams 74D, 74E, 74F and 74G is arranged on the shaft 76 to operate the switches 77D, 77E, 77F and 77G respectively. The two shafts 72 and 76 are connected for rotation with shaft 78 by the gears 79. The shaft 78 is turned to one side or the other from its central or neutral position by the controller handle 66.

A change in the direction of rotation of the motor is accomplished by the automatic transposition of the leads to its armature when the controller handle is moved. Cams 71D and 74D in each series operates switch 73D and 77D respectively of the associated series of switches for that purpose at the beginning of the movement of the controller handle. The remaining switches 73E, F and G are connected for forward rotation when the controller handle 66 is moved to the left; and the remaining switches 77E, F and G are connected for reverse rotation when the controller handle is moved to the right.

Except for the cam D and switch D in each series of cams and switches, for controlling direction of rotation, the other cams and switches of each series are employed to control the magnitude of the ignitor current to the ignitrons, in the first 30° of movement of the controller lever 66. The ignitor voltage is increased as the controller lever is moved through its arc of travel, by the progressive shunting of the resistor bank 81, which is connected in series with the output of rectifier 82 and the saturating windings of the saturable reactors 83, constituting a variable impedance. This impedance is in series with the primary winding of the thyratron anode transformer 84 and the main power supply 21 in order that the voltage applied to the thyratron anodes and therefore the period of conduction of the ignitrons controlled thereby can be varied in a manner presently to become apparent.

After the controller lever 66 has moved the cams 30°, all of the resistance bank 81 has been bypassed or shunted out by means of the switches, resulting in full excitation of the saturable reactors 83, thereby reducing to a minimum the impedance in the supply line to the thyratron anode transformer primary 84 so that the thyratrons 86 give the required ignitor current to the ignitron tubes 69. Thyratron tubes 86 "trigger" the ignitrons 69 by means of the ignitors 87. The purpose of controlling the magnitude of the ignitor current as described above, is to prolong the life of the ignitors by making the current in the ignitors at low motor speed less than that employed in normal operation.

The remaining section of the controller consists of the potentiometer rheostat assembly 68, which concerns the means for varying the speed of the motor 36 by varying the voltage supplied to the motor 36. To operate the motor efficiently at reduced speeds, and fully employ the wide speed range which is a characteristic of the direct current motor, both the armature and shunt field voltages are controlled through the means provided.

The armature voltage is controlled by a pair of ganged potentiometer rheostats 92 and 93. Potentiometer 92 is employed when the controller lever 66 is moved to the left for forward speed of the motor. Potentiometer 93 is employed when the motor is to be reversed, and the controller lever is moved to the right. Selection of the potentiometer section 92 or 93 is made by means of the double pole double throw auxiliary control switches 94 and 95. The switches 94 and 95 are operated mechanically by the shaft 97, rocked by the armature 98, which is moved by the coil 99R of the reversing magnetic switch 99.

When reversing switch coil 99R is energized by moving controller lever 66 to the right and closing switch 77D, the normally closed contacts 94 are opened thereby, disconnecting the forward potentiometer 92. At the same time, the normally open contacts 95 are closed, thus selecting the reverse potentiometer 93.

Selection of the forward potentiometer rheostat 92 is automatically made when the switch coil 99R is deenergized which allows the normally closed contacts 94 to assume their normally closed position. This same position is assumed at all times when the switch coil 99R is deenergized.

The sliders 101 and 102 of the forward and reverse potentiometers 92 and 93 respectively, are gang-operated by shaft 103 on which is fixed gear 104, driven by gear 105 fixed on shaft 78. The gears are in the ratio of 1 to 1.37 respectively, since it is desirable that the arc of travel of the potentiometer arms be considerably greater than that of the actuating controller handle 66.

To control the voltage applied to the armature 36A, the potentiometers 92 and 93 are employed with the phase shift network 106. These control only the small amount of direct current from the rectifier 82, which is necessary to vary the inductance of the six saturable reactors 107. The primary winding 108P of the thyratron grid transformer 108 is connected in the phase shift network 106 so that the grid voltage supplied by the secondary winding 108S can be shifted in phase with respect to the phase of the anode voltage applied to the thyratron tubes 86. By this lag or delayed firing in each cycle, the thyratrons 86 will correspondingly delay the "triggering" of the ignitrons. Therefore the average voltage output will be low, and the armature will operate at only a fraction of the basic speed of the motor.

The potentiometers 92 and 93 are so arranged that their resistance values are cut out within an angular movement of sliders 101 and 102 respectively, thereby applying rated armature voltage across the motor armature, resulting in operation of the motor at basic speed if rated voltage is applied across motor shunt field 38.

It should be understood that as the sliders 101 and 102 of the armature control potentiometers 92 and 93 are advanced from neutral position to a position 70° from neutral, the resistor segment or resistance 109 of the potentiometers will be gradually cut out; and that the effective resistance offered to the circuit for phase shifting purposes will be from maximum at neutral position to nothing at a point 70° or more from neutral position. The potentiometers are so constructed that the sliders travel beyond 70° without changing resistance value by allowing the sliders to ride over a non-resistance strip 110 of copper or other metal possessing reasonably good conductance.

The motor shunt field 38 is separately controlled by the rheostat 111, and connected to grid controlled thyratrons 112 and 113. The rheostat is operated by the controller handle 66, shaft 78, gears 105 and 114 (in the ratio of 1.37 to 1) and shaft 115. Through these connections, the slider 116 of the rheostat is mechanically actuated to move through the same angle as the sliders 101 and 102 of potentiometers 92 and 93 respectively, which control the armature voltage. As the slider 116 moves through 70° on either side of neutral, it rides on a copper strip 118, thus not affecting characteristics or output. During this time the voltage output from the field supply unit 39, will be at rated value and constant; and the voltage output from the ignitrons to the motor armature 36A will also be at its rated value, so that the motor will operate at basic speed. The rheostat 111 is used to extend the speed range beyond basic motor speed by taking advantage of the characteristic of the direct current motor the speed of which can be increased from two to four times its basic speed when its field excitation is weakened. This extra speed feature is often a great advantage, especially in dredge management, wherein many operations can be expedited when necessary. In most cases motor speeds will be selected to operate normally near the basic speed of motor, but the adjustable speed features of my invention may be employed to meet varying and unusual operating conditions either above or below the basic speed.

As the rheostat slider 116 leaves the conducting strip 118, it engages the remaining 50° of travel of one or the other of the resistor sections 119, thus inserting an increasing amount of resistance in the phase shifting circuit including capacitors 91 and 91a and the secondary 121SG of the transformer 121. Inserting more and more resistance in this circuit causes a phase shift in grid 122 of the thyratron 113, to a point where its output approaches zero, but leaving the associated thyratron 112 operating. Thyratrons 112 and 122 are energized by alternate parts of tapped secondary 121SA so that full wave rectification is obtained when both thyratrons are operative. When the output of thyratron 122 is reduced, the average voltage is reduced until at the point where thyratron 122 is cut-off, rectification is half wave; and the average voltage is considerably reduced. This arrangement is of particular value for the reason that the reduction of voltage for the motor shunt field is definitely limited to a safe value.

To secure refinements of circuit, various filters, condensers, resistors, reactors, transformers, and other devices may be suitably employed. I have omitted them from this description in order to avoid unnecessarily complicating the drawings and description of my invention.

Summarizing the above explanation, it can be seen that as the operator moves controller lever 66 in either direction, the motor 36 will start a slow rotation forwardly or in reverse as determined by direction of movement of the controller lever 66, and the closing of one of the switches 73D or 77D by the cam 71D or 74D respectively. The motor will then gradually and smoothly increase its speed as the operator advances the controller lever. The motor speed will be nearly proportional to the setting of the controller lever; and the operator can vary the speed as his judgment dictates to suit varying operating conditions.

With the closing of switch 73D for example, the circuit through lines 151 and 152 is completed, and the forward switch coil 99F is energized. The circuit 151—152 is a low voltage control supply derived from the transformer 153, energized from the main 3-phase alternating current supply 21.

Branch lines 154 and 155 extend to the primary 121P of the transformer 121.

At the first instant of movement of the controller handle 66 and shaft 78, the slider 101 of the potentiometer 92 sliding along the resistor segment 109, cuts out a small amount of the total resistance existing in the potentiometer 92 and the phase shift network 106, the latter including in series connection a saturable reactor 107 and a fixed resistor 159 for each of the six phases. This progressive lessening of resistance 109 causes a correspondingly small decrease in reactance 107 and therefore in the phase lag, so that the firing of the thyratrons 86 begins, to be followed successively by the ignitrons 69. The closing of circuit 151—152 energizes the coils 99F of the magnetic switch 99, pulling over the armature 160 and rocking the shaft 161 to close all of the switches, 162 and 163 in the motor armature lines 164 and 165, and switch 167 in the line 166 to the magnetic brake 169 so that the brake is released. It will be noted that the right-hand group of the switches actuated by shaft 161 are connected in parallel respectively with corresponding left-hand group of switches linked to shaft 97. These of course, come into action when the controller handle is moved to the right to secure reversal of the motor. Coincident with the closing of switch 73D, another switch 73E is closed by the cam 71E to establish a circuit in lines 170 and 171, shunting out a portion of the resistor bank 81, which is disposed in the direct current circuit from the rectifier 82 to the saturable reactor 83. Another network is in the line 172—174; and is connected to the potentiometers 92 and 93 by line 175, which in turn are connected by line 176 to the rectifier side of line 173. With continued movement of the controller handle, the cam 71F closes the switch 73F in the circuit 170—178 to shunt out the remaining portions of the resistor bank 81. Simultaneously with the turning of the cams 71E and 71F to close their associated switches, the slider 101 of the potentiometer 92 has advanced to remove more of the resistance 109 which effects a lessening of the angle of lag in the phase shifting network 106, thus causing thyratrons 86 to fire earlier in each cycle. The lessening of the angle of lag advances the phase of the voltage in the primary 108P, which is accompanied by an advance in phase of the voltage in the secondary 108S resulting in an earlier firing of the thyratrons.

With the further movement of the controller handle 66 through an additional angle of 10° cam 71G closes the corresponding switch 73G, establishing a shunt circuit in lines 170—179 around the resistor bank 81. At this point saturable reactor 83 has decreased to the value at which maximum or rated output is applied to the thyratron anode transformer 84. During all this time the current through line 172—174—175—176 and the network 106 has been continually increased as the arm 101 eliminates the resistance 109 in potentiometer 92. At a point where the arm has cut out all the resistance 109, the network 106 has shifted the grid voltage of the thyratron tubes 86 into the minimum angle of lag and to such a value as to give the rated voltage from the ignitrons 69 to the motor armature 36A. At this value, the basic speed of the motor has been reached, and irrespective of normal rated load, the motor will continue at this speed. If the motor is now to be stopped, the controller handle is moved back to neutral, breaking the circuits and allowing the spring operated brake 169 to set and bring the motor quickly to rest.

During the movement of the controller handle forwardly the slider 116 of the rheostat 111 has moved in contact with a copper strip 118, with no effect on the circuits, 181—182 connecting it to the thyratrons 112 and 113, which control the motor shunt field 38. At the time the motor has reached basic speed, the controller handle is at an angle of 70° with the vertical; and if it is pushed still further to the left, the slider 116 enters upon the resistor segment 119, introducing gradually increasing resistance into the circuit. It will be recalled that the primary 121P has been energized through the lines 154 and 155, the rated voltage to the shunt field 38 having been at the maximum point through the action of the secondaries 121SA, 121SG and 121SF and thyratrons 112 and 113. With the gradual building up of resistance in the line 181, a phase lag is created in the voltage supplied to the grid 122 of the thyratron tube 113 by the secondary 121SG of the grid transformer. As a result the voltage to the shunt field 38 through line 183 connecting it to the center tap of the filament transformer secondary 121SF, and through line 184 connecting it to the anode transformer secondary 121SA, is progressively reduced with corresponding lessening of field excitation to allow the motor 36 to speed up beyond its rated basic speed. The maximum speed is attained when the slide 116 has reached the end of resistor segment 119. At this point, only tube 112 remains in operation to prevent complete loss of the field excitation and the motor running wild.

Returning the controller handle 66 toward neutral position, first eliminates resistance in the potentiometer 111, and restores the normal rated shunt field voltage, bringing the motor speed down to basic. Then as the controller handle approaches the neutral position, the angle of phase lag in voltage supplied to the thyratrons 86 and caused by the network 106, gradually increases as the resistance in the potentiometer 92 returns to maximum, and the resistor bank is reinserted in the circuit through the saturable reactors. This reduction in voltage input to the armature, gradually reduces the motor speed and finally brings it to rest.

I claim:

1. An apparatus for controlling the speed of a direct current motor comprising a three-phase alternating current supply, an anode transformer having a secondary arranged for six-phase distribution, an ignitron tube for each phase and to the anode of which the phase is connected, said ignitron tube having a cathode connected to one side of the motor armature, a neutral bus connecting the other side of the armature to the neutral of the secondary of the transformer, a second anode transformer having a primary winding and a secondary winding, a plurality of controllable first impedances connecting the primary winding to the alternating current supply; said secondary being arranged for six-phase distribution and connected to the ignitron cathodes, a thyratron tube for each phase of the second transformer secondary and to the anode of which the phase is connected, each thyratron tube having a cathode connected to the ignitor of the ignitron of corresponding phase and means including a plurality of controllable phase shifting impedances for supplying the grid of each thyratron tube with voltage, and control means for simultaneously progressively decreasing the first 2,507,870

9 impedances to increase the thyratron anode voltage and advancing the phase of the grid excitation whereby the ignitor current and ignitron energy output to the motor armature are simultaneously increased.

2. An apparatus for controlling the speed of a direct current motor comprising a three-phase alternating current supply, a first anode transformer having a secondary winding arranged for six-phase distribution, an ignitron tube for each phase and to the anode of which the phase is connected, said ignitron tube having a cathode connected to one side of the motor armature, a neutral bus connecting the other side of the armature to the neutral of the secondary of the transformer, a second anode transformer having a primary and a secondary and having its secondary arranged for six phase distribution; a grid controlled gaseous discharge tube having a cathode, a control grid and an anode for each phase of the second transformer secondary, and to the anode of which the phase is connected and to the cathode of which the ignitron ignitor of corresponding phase is connected, said second anode transformer primary being connected to the alternating current supply through first controllable reactances; phase shifting network means for exciting the grid of the gaseous discharge tube, and unitary manual control means for simultaneously and progressively increasing the ignitor current and advancing its phase.

3. An apparatus for controlling the speed of a direct current motor comprising a three-phase alternating current supply, an anode transformer having a secondary arranged for six-phase distribution, an ignitron tube for each phase and to the anode of which the phase is connected, said ignitron tube having a cathode connected to one side of the motor armature, a neutral bus connecting the other side of the armature to the neutral of the secondary of the transformer, a second anode transformer having a primary and a secondary; controllable reactive means connecting the primary to the alternating current supply, said secondary being arranged for six-phase distribution and connected to the ignitron positive bus; a thyratron tube for each phase of the second transformer secondary, and to the anode of which the phase is connected, each thyratron tube having a cathode connected to the ignitor of the ignitron of corresponding phase, means including a controllable phase shifting circuit for supplying the grid of each thyratron tube with voltage and unitary control means for increasing the thyratron anode voltage and simultaneously shifting the phase of the grid current relative to the phase of the anode current to vary the firing of the thyratron tube.

4. In an adjustable speed motor drive, a source of polyphase alternating current, a first polyphase transformer having primary and secondary windings, the primary windings being connected to the source of alternating current, and the secondaries being star connected, a plurality of ignitrons each having a cathode, an anode, and an ignitor, the anodes being connected respectively to the free ends of the transformer secondaries, and the cathodes being connected together to provide a unidirectional current terminal; a second polyphase transformer having primary and secondary windings, the primary windings being connected to the source of alternating current, the secondary windings being star connected and each pair of adjacent free ends being connected together by a saturable reactor

10 in series with a resistor, a plurality of thyratrons, one for each phase and each having a cathode, anode, and a control grid, each cathode being connected in series with the ignitor of the ignitron of like phase; a grid input transformer for each thyratron having primary and secondary windings, the primary winding being connected between the common terminal of the star connected windings of the second transformer secondary and the junction between the resistor and reactor located between the secondary winding of the secondary transformer of respective phase and the adjacent succeeding winding, the secondary of the grid input transformer being connected to the respective thyratron grid, a third polyphase transformer having primary and secondary windings, the primary windings being connected to the source of alternating current through saturable reactors, and the secondaries being star-connected, the free ends of the secondaries being connected to the respective anodes of said thyratron, uni-control means for controlling the amount of saturation in said saturable reactors whereby the voltage applied to the anodes of the thyratrons is controlled as to amplitude and phase so as to control the on and off condition of the ignitrons and define the extinguishing time of each firing and the phase of the voltage applied to the grids of the thyratrons can be varied to control the initiation time of each firing of the thyratrons so that the output voltage and current of the ignitrons can be controlled smoothly from zero to maximum.

5. Motor control means for controlling the speed torque and direction of a direct current motor comprising a source of alternating current and an ignitor controlled rectifier source of pulsating direct current, reversing switch means connecting the motor armature to said source, ignitor exciting means comprising a plurality of thyratrons, first saturable reactors including control windings for controlling the potential of the thyratron anodes and the phase with respect to the source of alternating current, second saturable reactors including control windings for controlling the phase of excitation of the thyratron grids with respect to the anode excitation, said first and second saturable reactors having sufficient reactance to decrease the thyratron anode potential and delay the grid excitation to the non-firing condition, a source of direct current for the motor field comprising a pair of second thyratrons, a source of direct current, a series resistance connecting the first saturable reactor control windings in series with said direct current source, a potentiometer connecting said second saturable reactor control windings in series with said direct current source; one of said thyratrons having a phase shifting grid excitation control including a rheostat whereby its output is adjustable from maximum to zero; said motor control means including first means for progressively selecting the position of the said reversing switch, a plurality of switches sequentially operated to progressively short out portions of said series resistance, a mechanical coupling to said potentiometer to simultaneously progressively decrease its resistance to advance the phase of thyratron grid excitation and mechanically coupling means for progressively decreasing the output of the field supply source after the switches are closed and said potentiometer has been operated to the minimum resistance value whereby the direction of operation, the turning on, and the torque and speed of the motor are progressively selected.

6. Control means for controlling the direction and speed of a motor comprising an alternating current source, a first transformer having a primary winding connected to said source, and a plurality of secondary windings having a common junction and free ends, a plurality of ignitrons and means connecting each of said secondary windings to respective anodes of said ignitrons, a second transformer comprising primary and secondary windings, first saturable reactor means connecting said second transformer primary winding to said source of alternating current and including control windings, a source of direct current, a voltage divider connected in series with said source of direct current and said saturable reactor control windings, a plurality of cam controlled switches having a normally open condition and connected in shunt with respective portions of the voltage divider, a controller handle mechanically coupled to a common shaft, a plurality of cams, said cams being juxtaposed to said cam controlled switches and actuated by said common shaft to successively close the switches in sequence in response to progressive motion of said controller to thereby progressively raise the second transformer secondary voltage and advance its phase with respect to the ignitron anode potential, a third transformer comprising primary and secondary windings, said secondary windings having a common junction, a plurality of networks comprising a resistance and a second saturable reactor connected between adjacent phase windings of the third transformer, a plurality of thyratrons having their cathodes connected to respective ignitors of the ignitrons, their anodes connected to said second transformer secondary windings and their grids coupled through transformers having primary windings connected between the secondaries common junction and respective junctions of the aforesaid saturable reactors and resistances, said second saturable reactors having control windings, a rheostat mechanically coupled to the controller handle and connected in series with said direct current supply and the control windings of the second saturable reactors, whereby motion of said controller handle progressively closes said cam switches to raise the thyratron anode potential and thereby determine the potential applied to the thyratron anodes, and simultaneously the resistance of the rheostat is progressively reduced to reduce the lag in thyratron excitation to thereby exercise uniform control in the ignition potential and effective current, a motor armature connected between the first transformer secondaries common junction and the ignitrons, to thereby be closely controlled as to impressed potential and effective current.

7. An apparatus for controlling the speed of a direct current motor comprising an alternating current supply, an ignitron tube having a cathode, anode and igniter electrode, the anode being coupled to one side of the alternating current supply and the cathode being connected to one side of the motor armature, the other side of the alternating current supply being connected to the other side of the armature; a thyratron having an anode, cathode and grid, a thyratron anode transformer having a primary winding and at least one secondary winding, a controllable impedance connected in series between the primary winding and the alternating current supply, the secondary winding being connected across the thyratron anode and the ignition cathode, means including a phase shifting impedance connected to the thyratron grid for supplying the same with voltage, and a manual controller for simultaneously and progressively decreasing the first impedance to increase the thyratron anode voltage, and advancing the phase of the thyratron grid excitation whereby the igniter current and ignitron energy output to the motor armature are simultaneously increased.

8. An apparatus for controlling direct current power over a wide range comprising an alternating current supply, at least one vapor discharge device having a cathode, an anode and an igniter electrode, the anode being coupled to one side of the alternating current supply and the cathode being connected to a positive polarity output terminal, the other side of the alternating current supply being connected to a negative polarity output terminal; at least on thyratron, the thyratron having an anode, a cathode and a grid; means connecting the cathode of the thyratron to the igniter of the vapor discharge device, means including at least one controllable first impedance for impressing potential from said alternating current source on the thyratron anode and means including a phase shifting second impedance coupling the thyratron grid with said alternating current source, and a controller for simultaneously and progressively decreasing the first impedance to increase the thyratron anode voltage, and advancing the phase of the thyratron grid excitation whereby the igniter current and vapor discharge device energy output to the load terminals are simultaneously increased.

RAYMOND A. STREMEL.

REFERENCES CITED

The following references are of record in the file of this patent:

UNITED STATES PATENTS

| Number | Name | Date |
|---|---|---|
| 811,683 | Yeoman | Feb. 6, 1906 |
| 1,403,260 | Ludlum et al. | Jan. 10, 1922 |
| 1,408,758 | Meyer | Mar. 7, 1922 |
| 1,426,123 | Stoekle | Aug. 15, 1922 |
| 1,603,137 | Meyer | Oct. 12, 1926 |
| 2,157,888 | Dawson | May 9, 1939 |
| 2,259,293 | Cox et al. | Oct. 14, 1941 |
| 2,294,709 | Bechmann et al. | Sept. 1, 1942 |
| 2,312,117 | Moyer et al. | Feb. 23, 1943 |